(12) United States Patent
Kobayashi et al.

(10) Patent No.: US 10,890,835 B2
(45) Date of Patent: Jan. 12, 2021

(54) LIGHT CONVERSION DEVICE, LIGHT SOURCE APPARATUS, AND PROJECTION DISPLAY APPARATUS WITH IMPROVED COOLING EFFICIENCY

(71) Applicant: SONY CORPORATION, Tokyo (JP)

(72) Inventors: Izushi Kobayashi, Tokyo (JP); Masahiro Ishige, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/564,482

(22) PCT Filed: Apr. 5, 2016

(86) PCT No.: PCT/JP2016/061131
§ 371 (c)(1),
(2) Date: Oct. 5, 2017

(87) PCT Pub. No.: WO2016/170969
PCT Pub. Date: Oct. 27, 2016

(65) Prior Publication Data
US 2018/0066835 A1 Mar. 8, 2018

(30) Foreign Application Priority Data
Apr. 22, 2015 (JP) ................................ 2015-087846

(51) Int. Cl.
*G03B 21/16* (2006.01)
*G03B 21/20* (2006.01)
(Continued)

(52) U.S. Cl.
CPC ........... *G03B 21/16* (2013.01); *G03B 21/204* (2013.01); *H04N 9/3105* (2013.01);
(Continued)

(58) Field of Classification Search
CPC ..... G03B 21/204; G03B 21/16; H04N 9/3144
See application file for complete search history.

(56) References Cited

U.S. PATENT DOCUMENTS

| | | | |
|---|---|---|---|
| 6,618,213 B2 * | 9/2003 | Inamoto | F04D 17/08 348/743 |
| 7,018,051 B2 * | 3/2006 | Bok | G03B 21/16 348/743 |

(Continued)

FOREIGN PATENT DOCUMENTS

| | | |
|---|---|---|
| CN | 104238243 A | 12/2014 |
| JP | 2008-078477 A | 4/2008 |

(Continued)

OTHER PUBLICATIONS

International Search Report and Written Opinion of PCT Application No. PCT/JP2016/061131, dated Jul. 12, 2016, 12 pages of ISRWO.

(Continued)

*Primary Examiner* — Bao-Luan Q Le
(74) *Attorney, Agent, or Firm* — Chip Law Group

(57) ABSTRACT

A light conversion device according to one embodiment of the disclosure includes a light conversion section that is rotatable about an axis of rotation, a cooling section that cools the light conversion section, a housing that houses the light conversion section and the cooling section, and a partition member that is provided on the light conversion section, and partitions a space in the housing.

16 Claims, 8 Drawing Sheets

(51) Int. Cl.
*H04N 9/31* (2006.01)
*F21V 29/502* (2015.01)
*F21V 29/65* (2015.01)
*F21V 29/71* (2015.01)

(52) U.S. Cl.
CPC ......... *H04N 9/3144* (2013.01); *H04N 9/3158* (2013.01); *H04N 9/3161* (2013.01); *F21V 29/502* (2015.01); *F21V 29/65* (2015.01); *F21V 29/71* (2015.01)

(56) References Cited

U.S. PATENT DOCUMENTS

| | | | | |
|---|---|---|---|---|
| 8,678,597 | B2* | 3/2014 | Nishimura | G03B 21/16 353/119 |
| 9,010,971 | B2* | 4/2015 | Wang | G03B 21/204 362/373 |
| 9,310,054 | B2* | 4/2016 | Finsterbusch | G03B 21/204 |
| 9,405,177 | B2* | 8/2016 | Hu | G03B 21/16 |
| 9,442,351 | B2* | 9/2016 | Lin | G03B 21/16 |
| 9,470,887 | B2* | 10/2016 | Tsai | G02B 26/008 |
| 9,664,893 | B2* | 5/2017 | Yamagishi | G02B 26/008 |
| 9,995,996 | B2* | 6/2018 | Masuda | G03B 21/16 |
| 2002/0180938 | A1* | 12/2002 | Bok | G03B 21/16 353/52 |
| 2003/0095349 | A1* | 5/2003 | Inamoto | F04D 17/08 359/889 |
| 2012/0013854 | A1* | 1/2012 | Nishimura | G03B 21/16 353/57 |
| 2012/0097376 | A1* | 4/2012 | Lin | G03B 21/16 165/121 |
| 2013/0169938 | A1* | 7/2013 | Huang | G03B 21/16 353/31 |
| 2013/0301237 | A1* | 11/2013 | Finsterbusch | G03B 21/204 362/84 |
| 2015/0009685 | A1* | 1/2015 | Wang | G03B 21/16 362/323 |
| 2015/0085260 | A1* | 3/2015 | Hu | G03B 21/16 353/61 |
| 2015/0092164 | A1* | 4/2015 | Lin | G03B 21/16 353/57 |
| 2016/0077325 | A1* | 3/2016 | Tsai | G02B 26/008 353/31 |
| 2016/0077326 | A1* | 3/2016 | Yamagishi | G02B 26/008 353/61 |
| 2016/0291449 | A1* | 10/2016 | Masuda | G03B 21/16 |
| 2017/0052434 | A1* | 2/2017 | Masuda | G03B 21/16 |
| 2017/0353701 | A1* | 12/2017 | Egawa | H04N 9/3158 |
| 2018/0011392 | A1* | 1/2018 | Utsunomiya | G03B 21/16 |

FOREIGN PATENT DOCUMENTS

| | | |
|---|---|---|
| JP | 2008-78477 A | 4/2008 |
| JP | 2008-141798 A | 6/2008 |
| JP | 2012-181309 A | 9/2012 |
| JP | 2013-051788 A | 3/2013 |
| JP | 2013-51788 A | 3/2013 |
| JP | 2014-92599 A | 5/2014 |
| JP | 2014-092599 A | 5/2014 |
| JP | 2015-036708 A | 2/2015 |

OTHER PUBLICATIONS

Office Action for CN Patent Application No. 201680021821.0, dated Aug. 1, 2019, 06 pages of Office Action and 08 pages of English Translation.

Office Action for JP Patent Application No. 2017-514052, dated Apr. 21, 2020, 06 pages of Office Action and 05 ppages of English Translation.

* cited by examiner

[ FIG. 1A ]
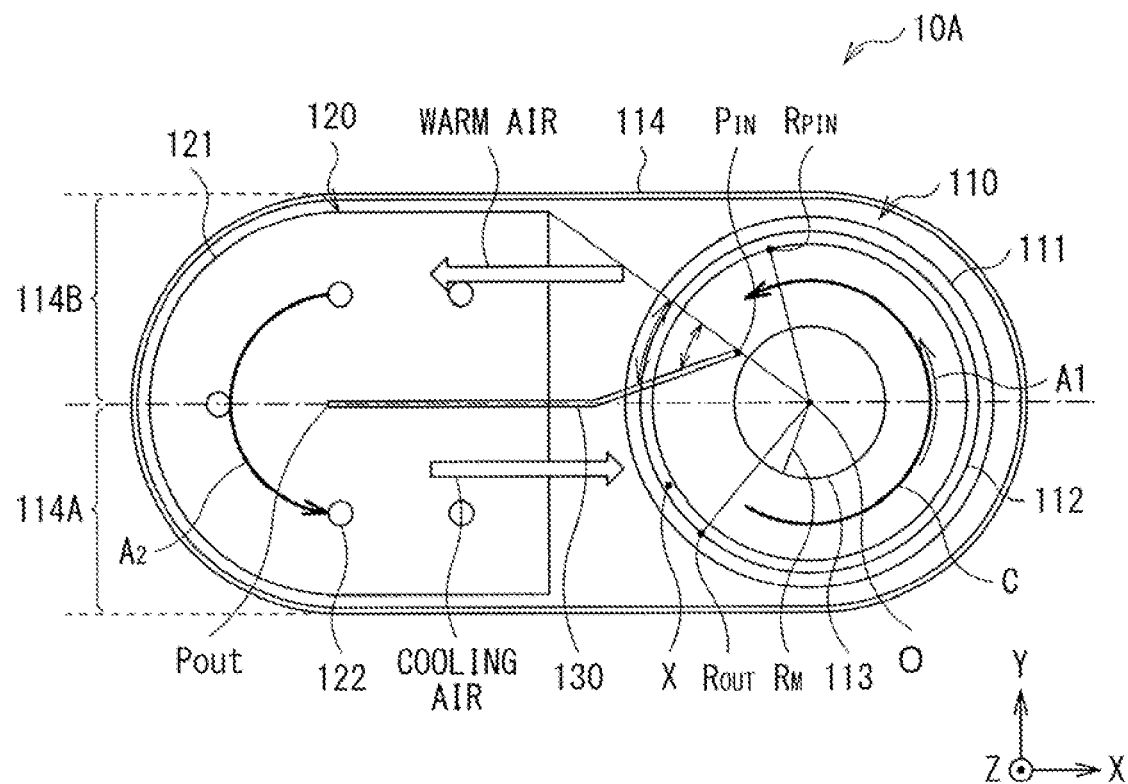
[ FIG. 1B ]
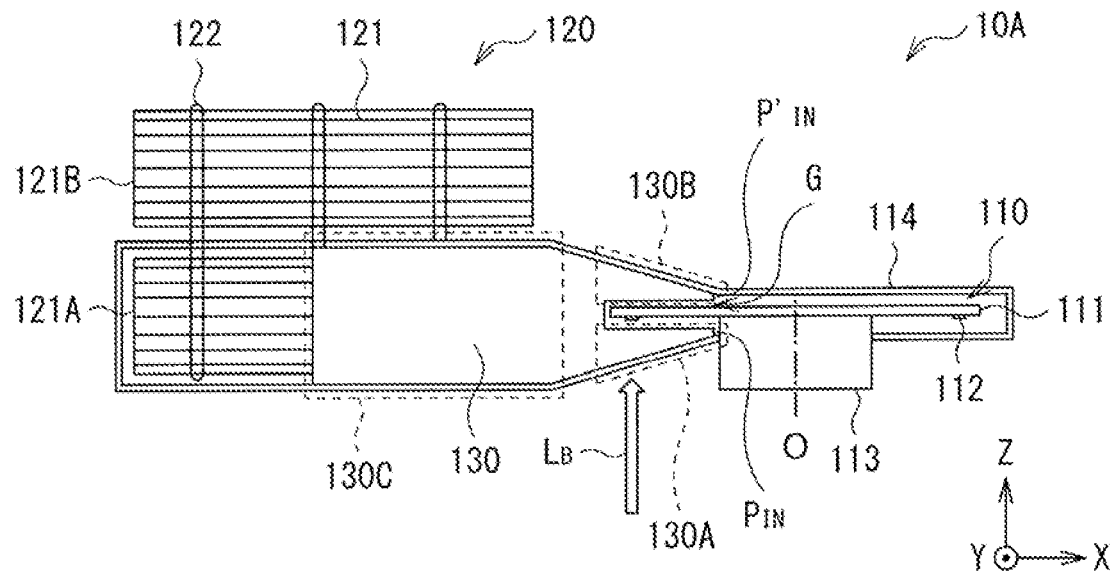

[ FIG. 2A ]
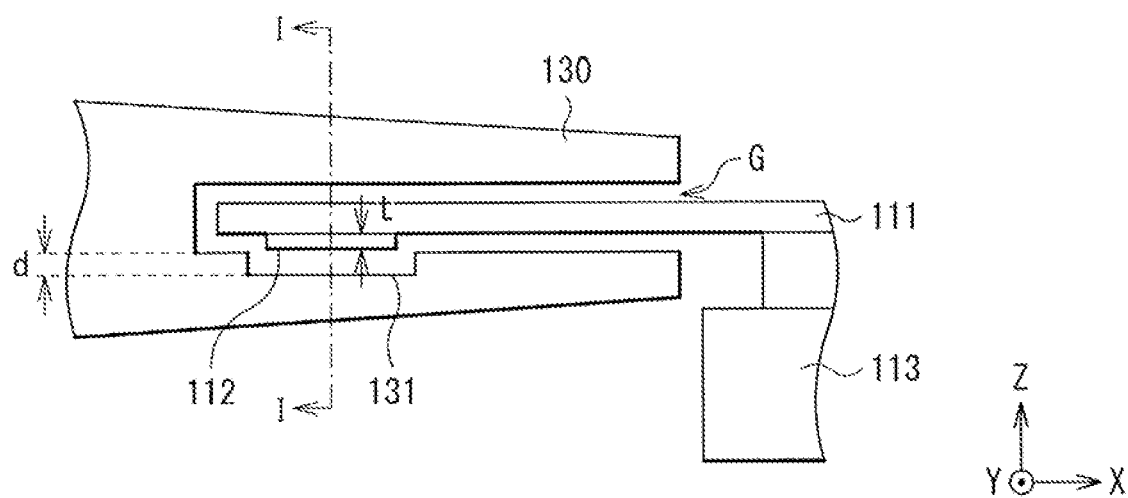
[ FIG. 2B ]
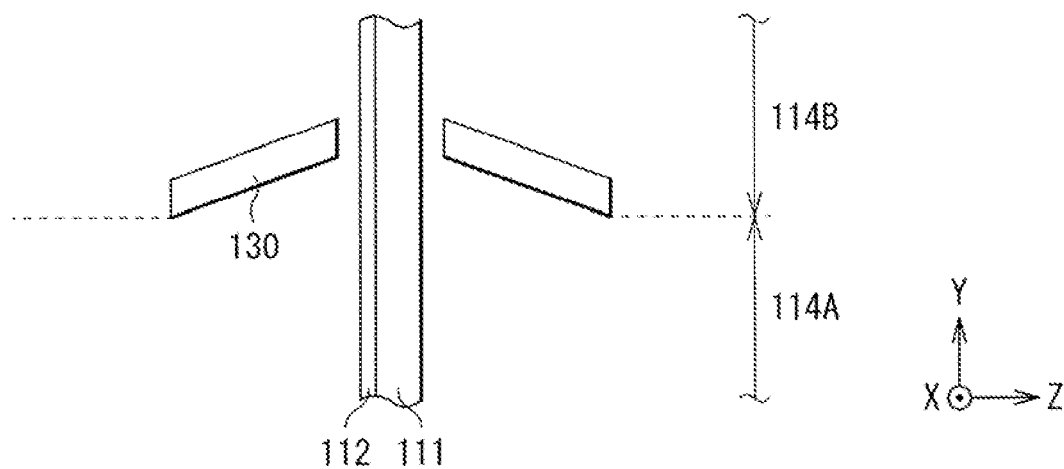

[FIG. 3]
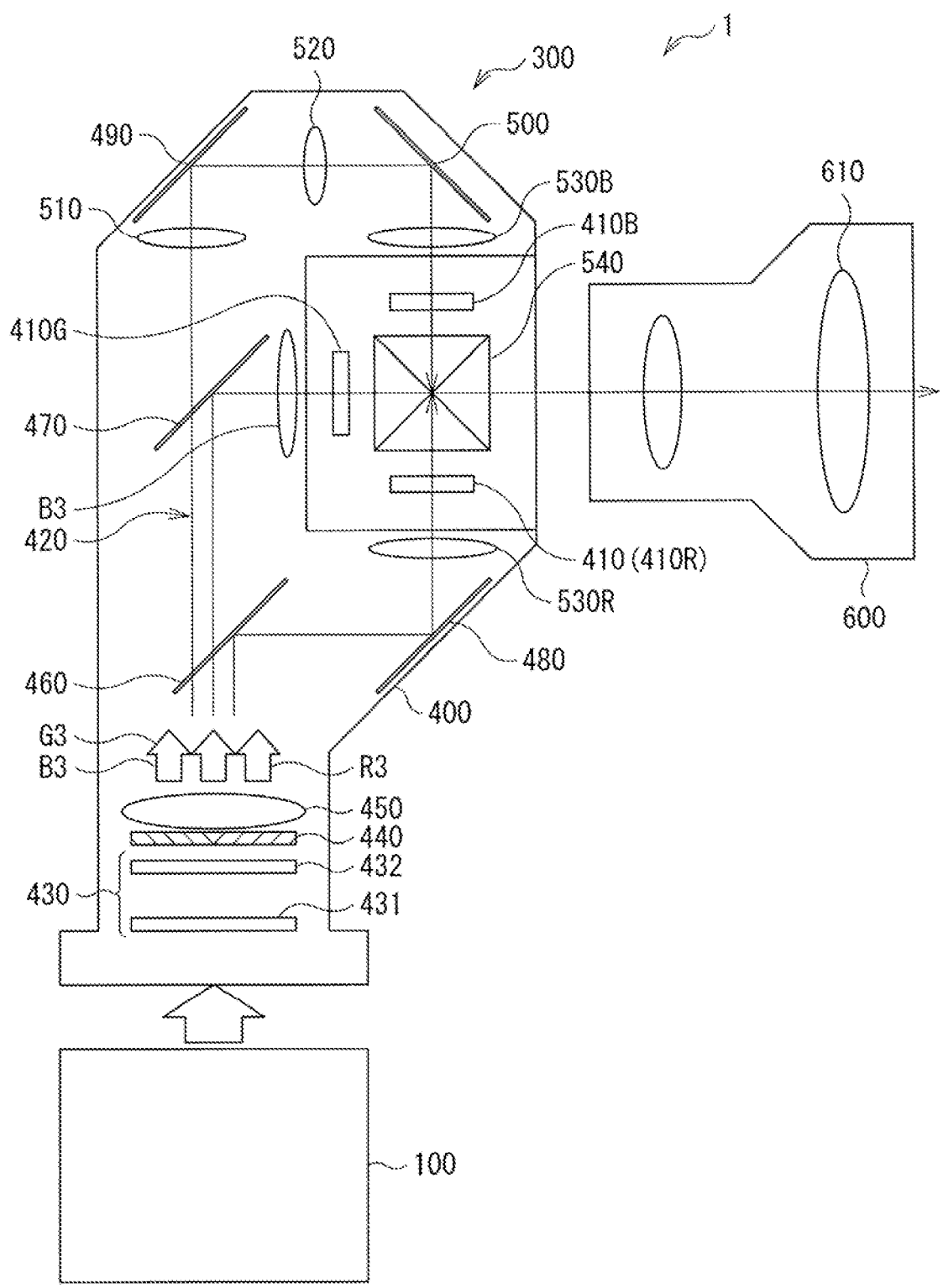

[FIG. 4]
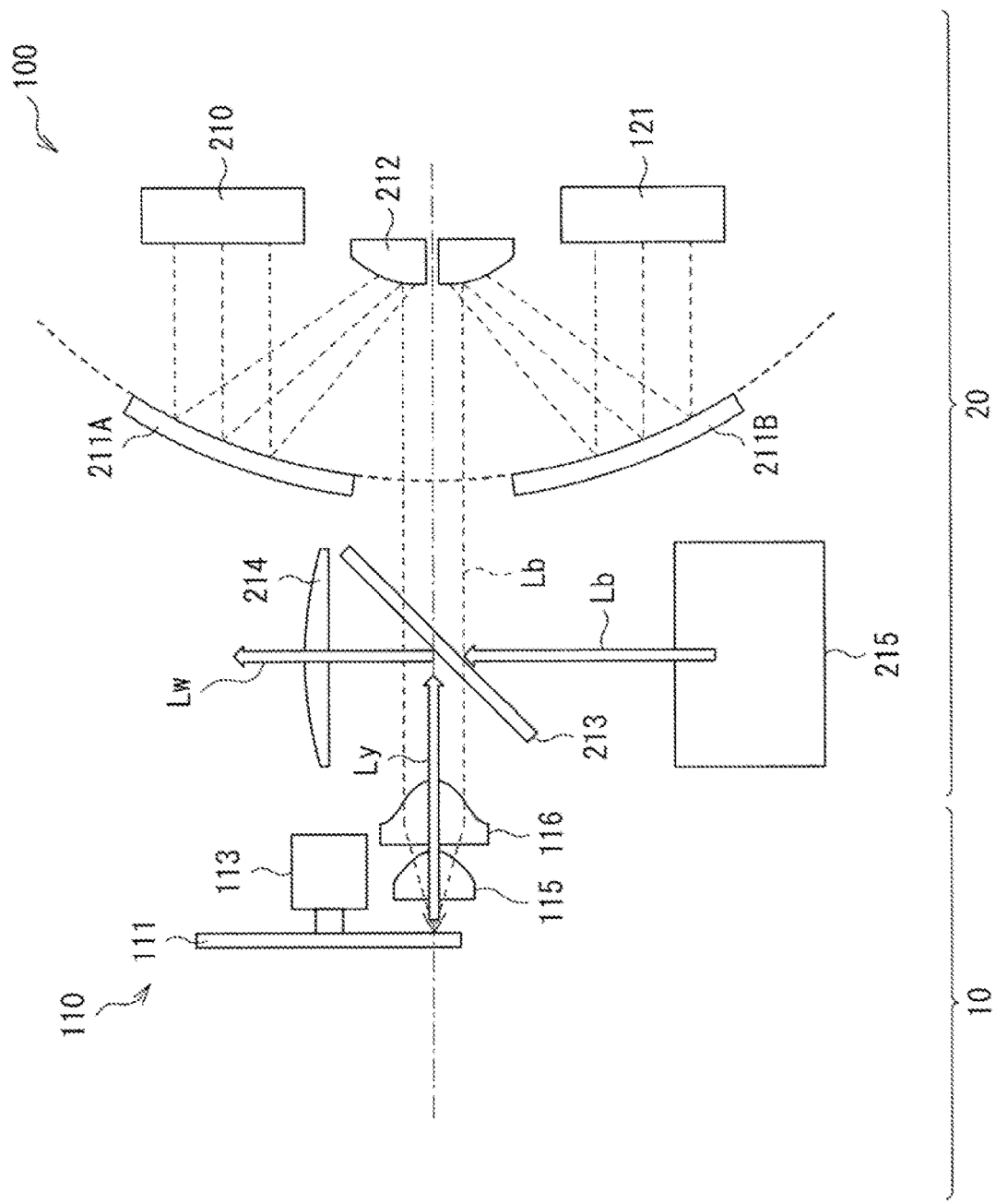

[ FIG. 5 ]
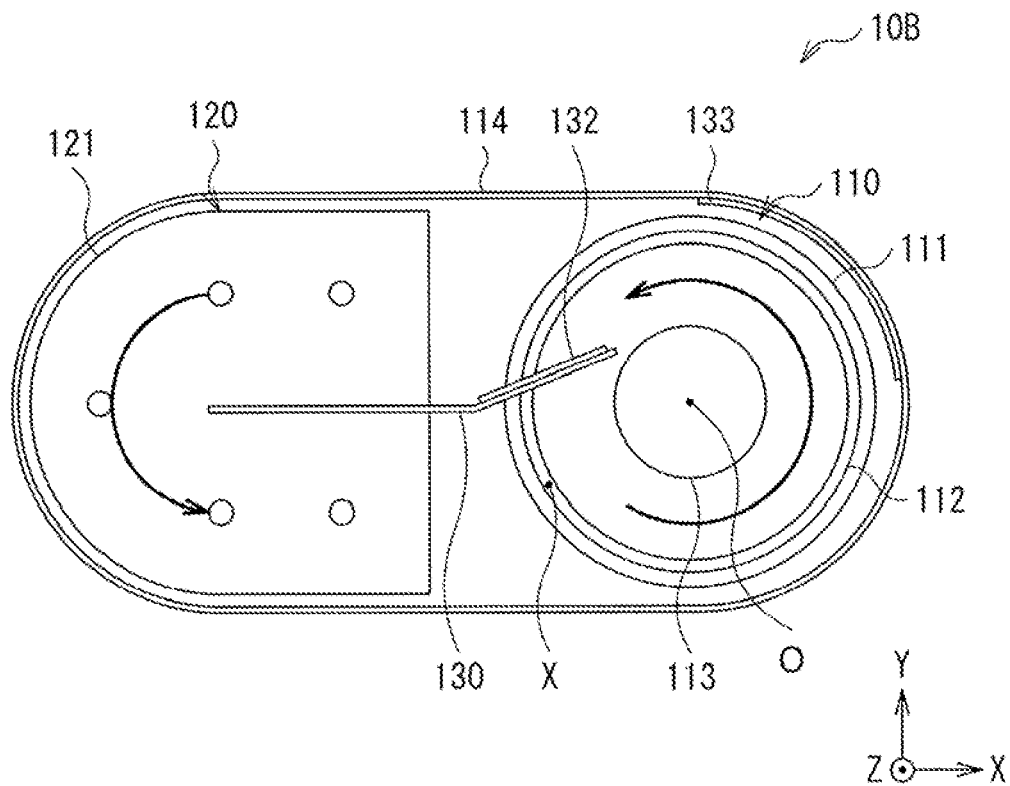
[ FIG. 6 ]
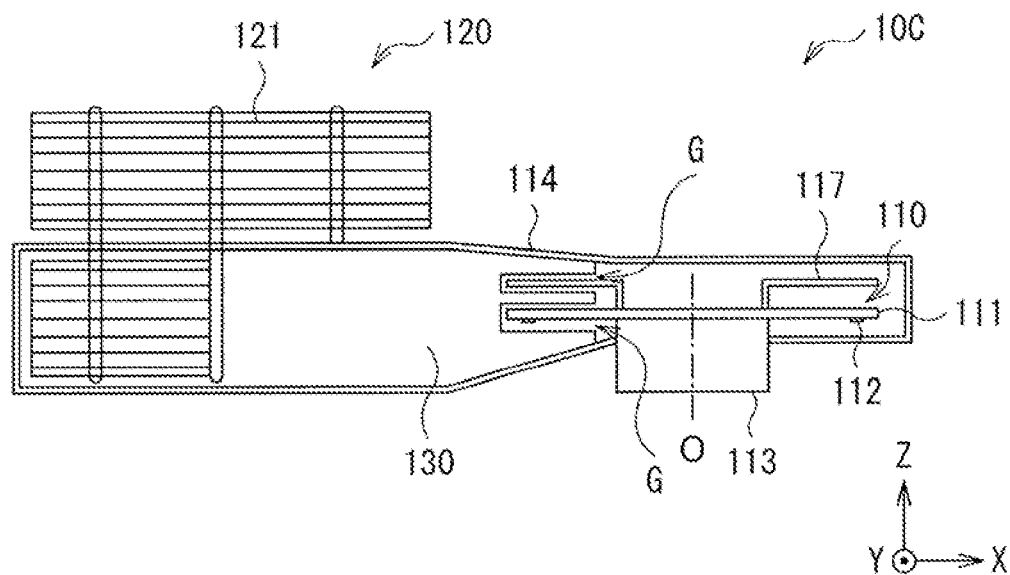

[ FIG. 7A ]
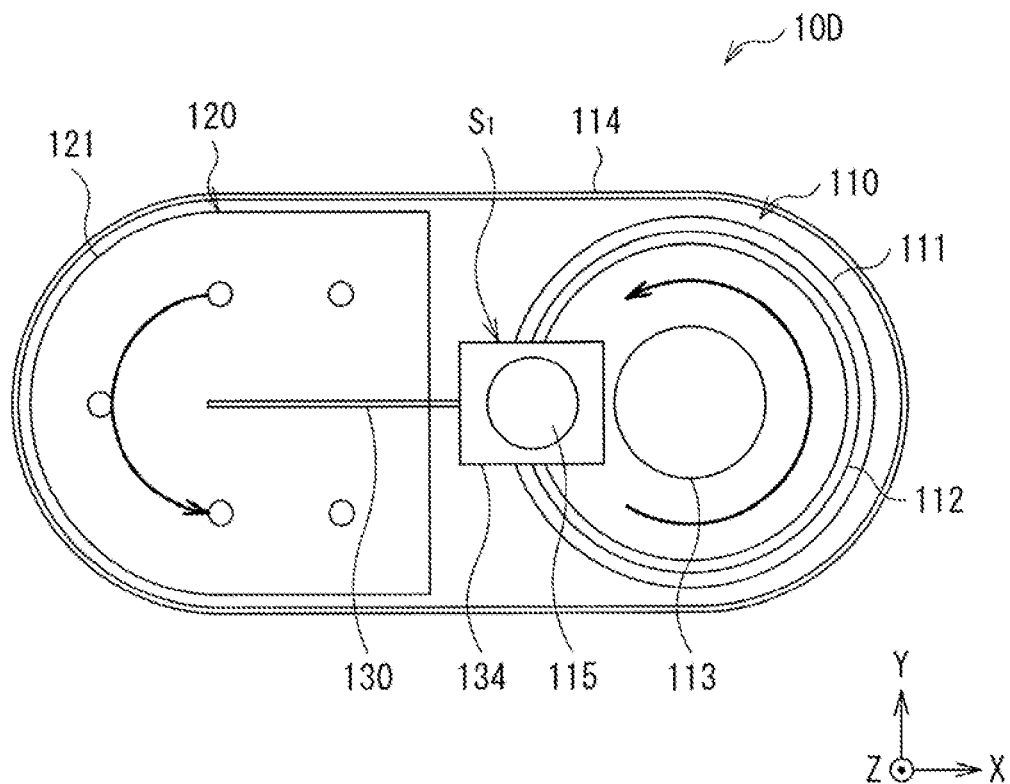
[ FIG. 7B ]
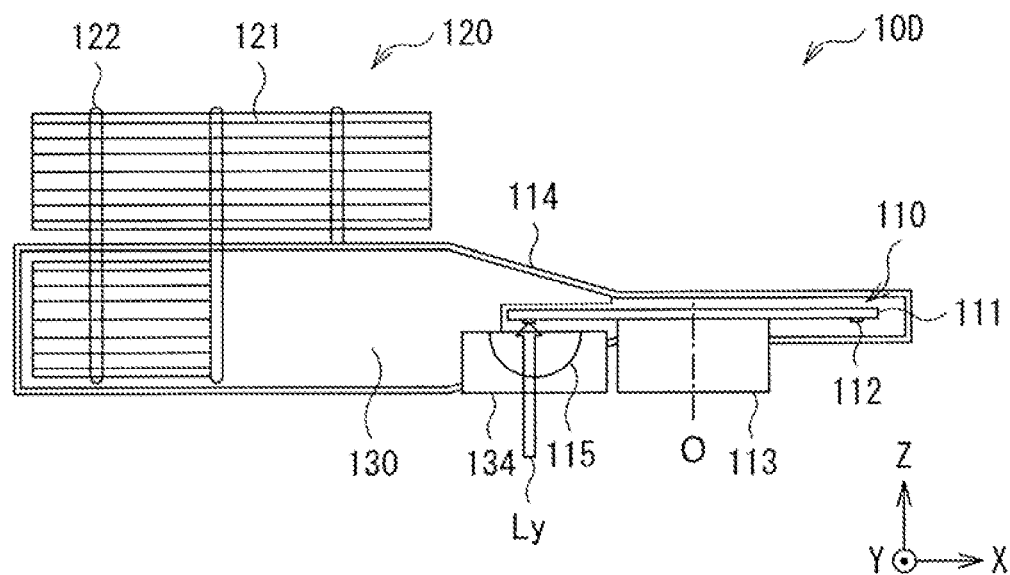

[ FIG. 8A ]
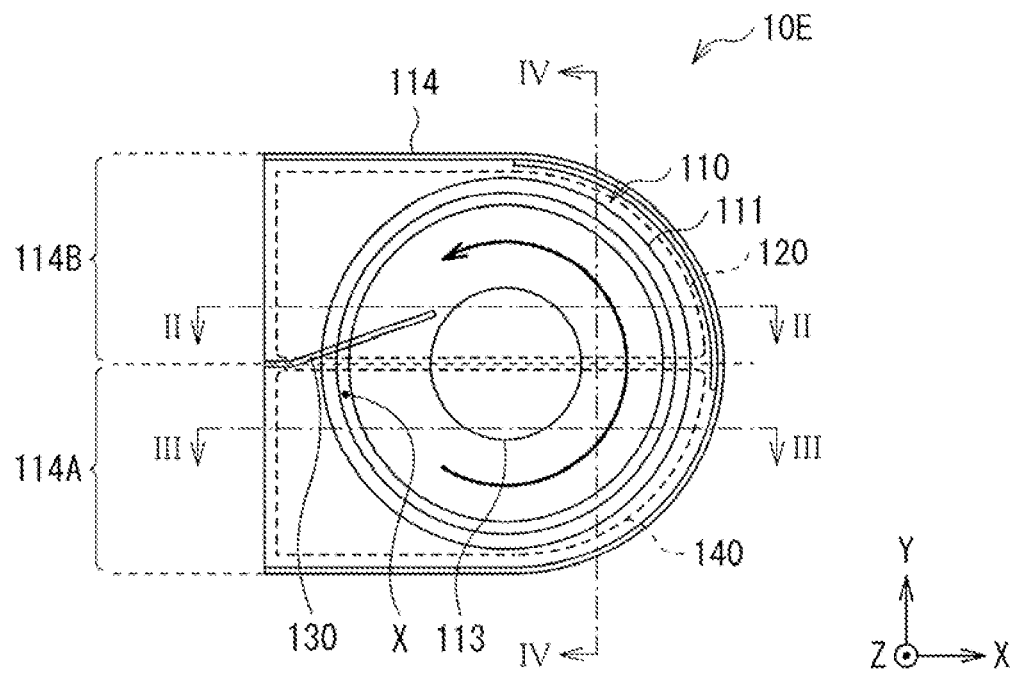
[ FIG. 8B ]
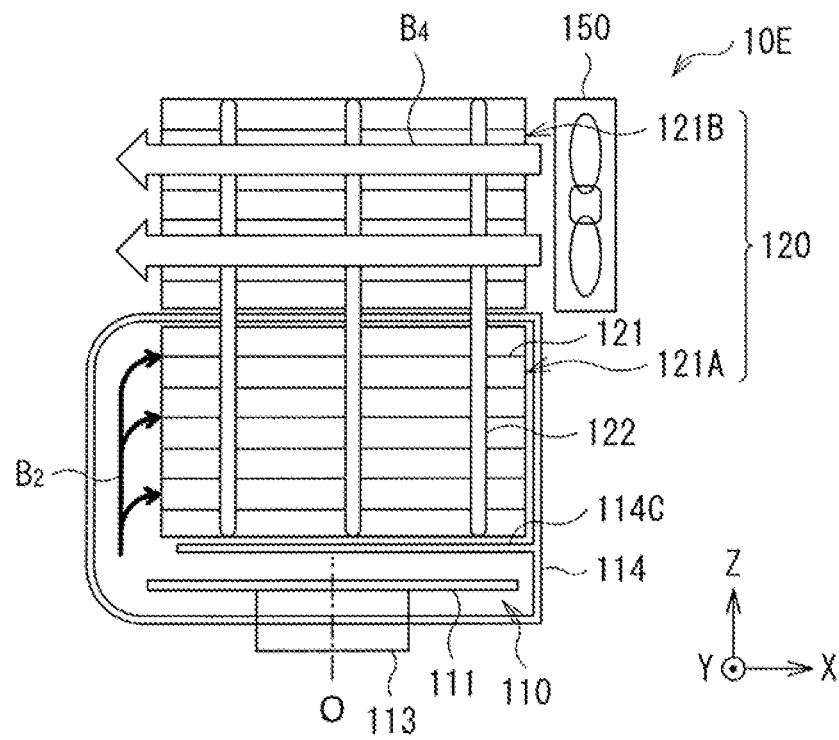

[ FIG. 8C ]
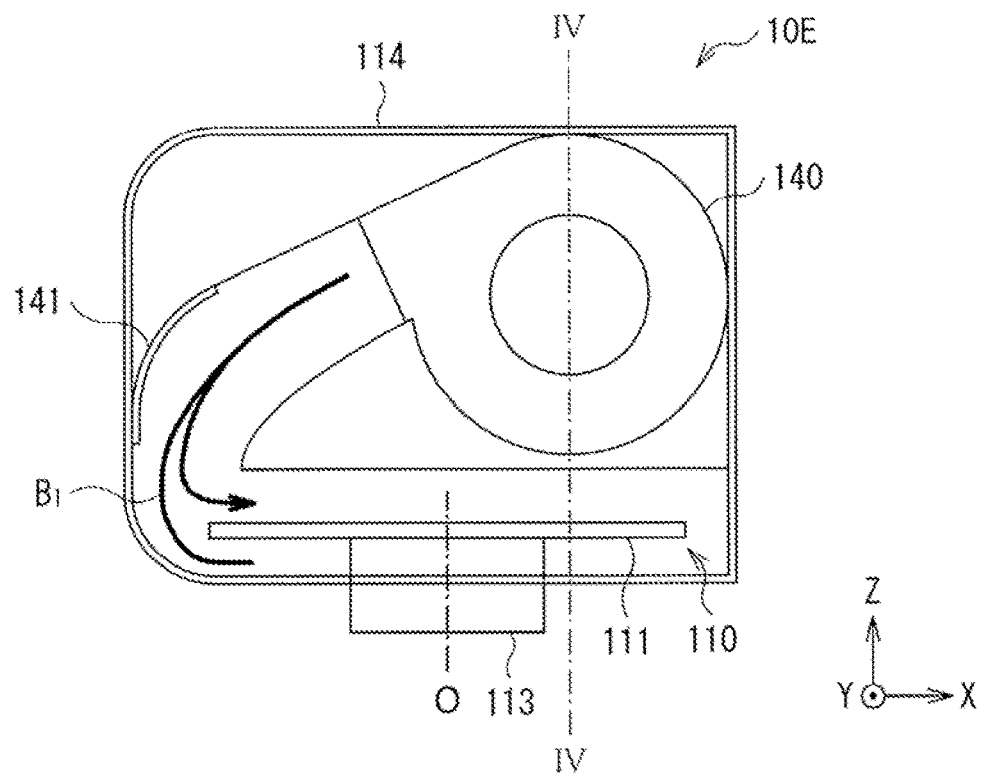
[ FIG. 8D ]
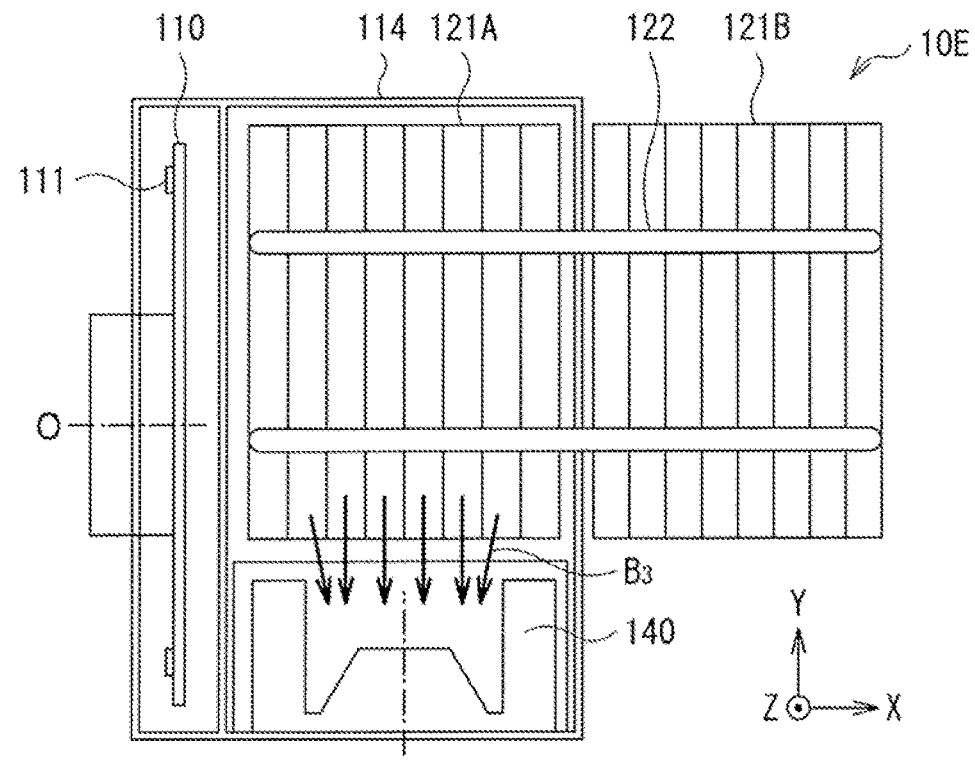

LIGHT CONVERSION DEVICE, LIGHT SOURCE APPARATUS, AND PROJECTION DISPLAY APPARATUS WITH IMPROVED COOLING EFFICIENCY

CROSS REFERENCE TO RELATED APPLICATIONS

This application is a U.S. National Phase of International Patent Application No. PCT/JP2016/061131 filed on Apr. 5, 2016, which claims priority benefit of Japanese Patent Application No. JP 2015-087846 filed in the Japan Patent Office on Apr. 22, 2015. Each of the above-referenced applications is hereby incorporated herein by reference in its entirety.

TECHNICAL FIELD

The disclosure relates to a light conversion device that converts excitation light into light of a wavelength region different from that of the excitation light and outputs the converted light, and light source apparatus and projection display apparatus equipped therewith.

BACKGROUND ART

In recent years, the number of products has been increased that adopt not existing high-pressure mercury lamps, xenon lamps and so forth but solid-state light emitting elements such as light emitting diodes (LEDs) and laser diodes (LDs) as light sources used in projectors and so forth for a presentation and a digital cinema. The solid-state light emitting element such as the LED is more advantageous than a discharge lamp in terms of not only size and power consumption but also high reliability. Above all, it is effective to increase light utilization efficiency by using the LD that is a point light source in order to achieve further luminance heightening and power consumption reduction.

The one that excites a phosphor that is formed on a rotating base with laser light emitted from the LD and utilizes fluorescence outputted by the excitation is being developed as the projection display apparatus that uses the LD as the light source. In such a projection display apparatus, it is necessary to suppress a rise in temperature for temperature characteristics of light conversion efficiency of the phosphor and heat resisting property of a binder and so forth used for formation of the phosphor on the base. Therefore, for example, in Patent Literature 1, there is disclosed a projection display apparatus in which a phosphor wheel device to which a phosphor wheel on which a phosphor layer is formed and that is rotationally driven by a motor is attached and a fan that sends cooling air to a light emitting section of the phosphor layer are contained in an airtight container. An air circulation path is provided in the airtight container such that air from the fan flows to the light emitting section of the phosphor wheel.

CITATION LIST

Patent Literature

Patent Literature 1: Japanese Unexamined Patent Application Publication No. 2014-92599

SUMMARY OF THE INVENTION

However, in the projection display apparatus in the Patent Literature 1, there is such a concern that the air that has been warmed by the light emitting section flows to the cooling air flow-in side before cooled by a heat exchanger and sufficient cooling efficiency is not obtained.

Therefore, it is desirable to provide a light conversion device that is able to improve cooling efficiency, and a light source apparatus and a projection display apparatus each of which is equipped with such a light conversion device.

A light conversion device according to one embodiment of the disclosure includes: a light conversion section that is rotatable about an axis of rotation; a cooling section that cools the light conversion section; a housing that houses the light conversion section and the cooling section; and a partition member that is provided on the light conversion section, and partitions a space in the housing.

A light source apparatus according to one embodiment of the disclosure includes a light source optical system including one or two or more light sources and a light conversion device that converts a wavelength of light outputted from the light source. The light conversion device included in the light source apparatus includes the same constitutional elements as those of the above-described light conversion device of the disclosure.

A projection display apparatus according to one embodiment of the disclosure includes: a light source optical system; an image generation optical system that generates image light by modulating, on basis of an input picture signal, light from the light source optical system; and a projection optical system that projects the image light generated by the image generation optical system. The light source optical system that is mounted on the projection display apparatus includes the same constitutional elements as those of the above-described light source apparatus of the disclosure.

In the light conversion device according to one embodiment, and the light source apparatus according to one embodiment and the projection display apparatus according to one embodiment of the disclosure, the partition member that is provided on the light conversion section and partitions the space in the housing is provided in the housing that houses the light conversion section that is rotatable about the axis of rotation and the cooling section that cools the light conversion section. Thereby, a flow of air that circulates in the housing is regulated.

In the light conversion device according to one embodiment, and the light source apparatus according to one embodiment and the projection display apparatus according to one embodiment of the disclosure, the partition member that partitions the space in the housing is provided on the light conversion section that is housed in the housing. Thereby, the flow of the air that circulates in the housing is regulated. In particular, the flow of air on the light conversion section is regulated and thereby it becomes possible to improve the cooling efficiency of the light conversion section. Incidentally, effects that are described here are not necessarily limitative and there may be any effect described in the disclosure.

BRIEF DESCRIPTION OF THE DRAWINGS

FIG. 1A is a plan view illustrating a configuration of a light conversion device according to one embodiment of the disclosure.

FIG. 1B is a cross-sectional view illustrating the configuration of the light conversion device illustrated in FIG. 1A.

FIG. 2A is an enlarged cross-sectional view in which the light conversion device illustrated in FIG. 1A and FIG. 1B is viewed from one direction.

FIG. 2B is an enlarged cross-sectional view in which the light conversion device illustrated in FIG. 1A and FIG. 1B is viewed from another direction.

FIG. 3 is a schematic diagram illustrating a configuration example of a projection display apparatus equipped with the light conversion device illustrated in FIG. 1A and FIG. 1B.

FIG. 4 is a schematic diagram illustrating a configuration example of a light source optical system of the projection display apparatus illustrated in FIG. 3.

FIG. 5 is a plan view illustrating a configuration of a light conversion device according to a modification example 1 of the disclosure.

FIG. 6 is a cross-sectional view illustrating a configuration of a light conversion device according to a modification example 2 of the disclosure.

FIG. 7A is a plan view illustrating a configuration of a light conversion device according to a modification example 3 of the disclosure.

FIG. 7B is a cross-sectional view illustrating the configuration of the light conversion device illustrated in FIG. 7A.

FIG. 8A is a plan view illustrating a configuration of a light conversion device according to a modification example 4 of the disclosure.

FIG. 8B is a cross-sectional view illustrating a configuration along the II-II line of the light conversion device illustrated in FIG. 8A.

FIG. 8C is a cross-sectional view illustrating a configuration along the III-III line of the light conversion device illustrated in FIG. 8A.

FIG. 8D is a cross-sectional view illustrating a configuration along the IV-IV line of the light conversion device illustrated in FIG. 8A.

DESCRIPTION OF EMBODIMENTS

In the following, one embodiment of the disclosure will be described in detail with reference to the drawings. Incidentally, description will be made in the following order.
1. Embodiment (a light conversion device in which a partition plate is provided on a wheel)
 1-1. Configuration of Light Conversion Device
 1-2. Configuration of Projection Display Apparatus
 1-3. Workings and Effects
2. Modification Examples
 2-1. Modification Example 1 (an example in which dust-absorbing pads are provided on the partition plate and a portion of the housing)
 2-2. Modification Example 2 (an example in which a cooling fin is provided on a back surface of the wheel)
 2-3. Modification Example 3 (an example in which a lens holder is used as the partition plate)
 2-4. Modification Example 4 (an example in which a fan is built in)

1. EMBODIMENT

FIG. 1A illustrates a planar configuration of a light conversion device (a light conversion device 10A) according to one embodiment of the disclosure and FIG. 1B illustrates a cross-sectional configuration in a case where the light conversion device 10A illustrated in FIG. 1A is viewed from a Y-axis direction. The light conversion device 10A is used as, for example, a light conversion device 10 of a light source optical system (a light source apparatus) 100 of a projection display apparatus 1 which will be described later (see FIG. 3 and FIG. 4).

1-1. Configuration of Light Conversion Device

In the light conversion device 10A, a phosphor wheel 110 (a light conversion section) and a heat exchanger 120 (a cooling section) are housed in a housing 114. The phosphor wheel 110 is configured by a substrate 111 on a surface of which a phosphor layer 112 is provided as a light emitting layer, a motor 113 that rotationally drives the substrate 111, and condensing lenses 115 and 116 that condense light (blue laser light Lb) that enters from a light source section 20 on the phosphor layer 112 (see FIG. 4). In the present embodiment, a configuration is included in which a partition member (a partition plate 130) that partitions a space in the housing 114 is provided on the phosphor wheel 110.

The substrate 111 has, for example, a disk shape and is made of a material that is relatively high in thermal conductivity such as, for example, aluminum, sapphire, and molybdenum. The motor 113 that drives the phosphor wheel 110 is coupled to the center of the substrate 111. Where a normal line that passes the center of the substrate 111 is an axis of rotation O, the substrate 111 is made rotatable in an arrow C direction about the axis of rotation O.

The phosphor layer 112 is excited with light that enters from the light source section 20 and emits light of a wavelength region that is different from the wavelength of the light. In the present embodiment, the phosphor layer 112 contains a fluorescent material that generates fluorescence by being excited with the blue laser light Lb that has a center wavelength of, for example, about 445 nm and converts portion of the blue laser light Lb that is outputted from a light source 210 into yellow light Ly and outputs the yellow light Ly. At this time, the substrate 111 is heated by being irradiated with the blue laser light Lb and warms the air in the housing. The warmed air flows in a direction A1 that is the same as the rotation direction C of the substrate 111 by rotation of the substrate 111 and is cooled by the heat exchanger 120 which will be described later. The cooled air is circulated in an arrow A2 direction illustrated in FIG. 1A and cools, as cooling air, a light emitting section X of the phosphor layer 112 on the substrate 111 on which the blue laser light Lb is concentrated.

As the fluorescent material contained in the phosphor layer 112, for example, a YAG (yttrium-aluminum-garnet)-based phosphor is used. Incidentally, there is no limitation on the kind of the fluorescent material, the wavelength region of light to be excited, and the wavelength region of visible light that is generated by the excitation.

In the phosphor wheel 110, the substrate 111 is rotated by the motor 113 and thereby a focal position on the phosphor layer 112 that is to be irradiated with the blue laser light Lb is relatively moved. Thereby, it becomes possible to avoid temperature rising of the substrate 111 and the phosphor layer 112 caused by long-term irradiation of the same position of the phosphor layer 112 with the excitation light and deterioration of the phosphor layer 112 caused by temperature rising.

Incidentally, the yellow light Ly that is outputted from the phosphor layer 112 is reflected toward, for example, the light source section 20 side and is reflected, toward the condensing lens 214 side, by a dichroic mirror 213 that is disposed between the phosphor wheel 110 and the light source 210 and so forth. At this time, the yellow light Ly is synthesized with the blue laser light Lb that is oscillated from, for example, a blue light source optical system 215 that is disposed at a position facing the condensing lens 214 with the dichroic mirror 213 being interposed, thereby becoming white light Lw.

The heat exchanger 120 excites the phosphor by irradiation of the blue laser light Lb, and outputs the fluorescence. The heat exchanger 120 is adapted to cool the light emitting section X on the phosphor layer 112 and the air in the housing 114 that has been warmed with heat generated when the phosphor is excited. The heat exchanger 120 is configured by, for example, a plurality of metal heat dissipation fins 121, and has a configuration in which a heat absorption portion 121A is disposed in the housing 114, a heat dissipation portion 121B is disposed outside the housing 114, and the respective portions are coupled together by a heat pipe 122.

The partition plate 130 is provided on the phosphor wheel 110 and partitions the space in the housing 114 as described above, and is fixed in, for example, the housing 114. Specifically, the partition plate 130 partitions the space in the housing 114 into a first space 114A that includes the light emitting section X on the phosphor wheel 110 and a second space 114B not including the light emitting section X. A flow of air in the housing 114 that is generated by the rotation of the phosphor wheel 110 is regulated by providing the partition plate 130 on the phosphor wheel 110. Specifically, the air that has been warmed by the substrate 111 that has been heated by being irradiated with the blue laser light Lb flows into the light emitting section X before cooled by the heat exchanger 120 and is mixed with the cooling air, and thereby it becomes possible to prevent a reduction in cooling efficiency around the light emitting section X.

The partition plate 130 is configured by a noninflammable material, for example, a metal plate. For example, in a case where the motor 113 is provided on the side of a surface of the phosphor wheel 110 to be irradiated with the blue laser light Lb, it is preferable that a length of the partition plate 130 provided on the phosphor wheel 110 be longer than a distance from an outer edge end face of the substrate 111 to a side surface of the motor 113. For example, in a case where a rotation direction of the phosphor wheel 110 rotates in an arrow direction illustrated in FIG. 1A, it is preferable that a motor 113 side end face $P_{IN}$ of the partition plate 130 be inclined toward the side opposite to the light emitting section X on the phosphor layer 112 as illustrated in FIG. 1A. Thereby, the warmed air that flows from the light emitting section X in the same direction A1 as the rotation direction of the substrate 111 is efficiently circulated toward the heat exchanger 120 side. Incidentally, in a case where the rotation direction of the phosphor wheel 110 rotates reversely to the arrow direction illustrated in FIG. 1A, it is preferable that the motor 113 side end face $P_{IN}$ of the partition plate 130 be inclined toward the light emitting section X side on the phosphor layer 112 in a direction opposite to that in FIG. 1A. That is, it is preferable that the motor 113 side end face $P_{IN}$ of the partition plate 130 be inclined in a direction in which the air that circulates on the phosphor wheel 110 flows into the heat exchanger 120 side. Thereby, it becomes possible to efficiently cool the air that has been warmed by the light emitting section X.

Further, it is preferable that an end face $P_{OUT}$ on the side opposite to the motor 113 side end face $P_{IN}$ of the partition plate 130 extend to the heat exchanger 120 as illustrated in FIG. 1A and FIG. 1B. Thereby, an air circulation path in the housing 114 is elongated. In other words, it is preferable that the partition plate 130 have a first region 130A that is provided on, for example, the phosphor wheel 110, specifically, at a position corresponding to the irradiated surface of the phosphor wheel 110 (and a second region 130B that is provided at a position corresponding to the back surface (a not-irradiated surface) of the phosphor wheel 110 which will be described later) and a third region 130C that is provided at a position corresponding to the heat exchanger 120 as illustrated in FIG. 1B. Thereby, the air (warm air) that has been warmed by being irradiated with the blue laser light Lb is sufficiently cooled by the heat exchanger 120 and then is sent to the light emitting section X as the cooling air.

In addition, the position of the motor 113 side end face $P_{IN}$ of the partition plate 130 is defined as follows. In a case where a distance between the motor 113 side end face $P_{IN}$ of the partition plate 130 and the axis of rotation O of the phosphor wheel 110 is $P_{IN}$–O, a distance between an inner circumference $R_{PIN}$ of the phosphor layer 112 and the axis of rotation O of the phosphor wheel 110 is $R_{PIN}$–O, and a radius of the motor 113 is $R_M$, it is preferable that the motor 113 side end face $P_{IN}$ of the partition plate 130 be $R_{PIN}$–O>$P_{IN}$–O>$R_M$. In addition, in a case where a distance between an outer circumference $R_{OUT}$ of the phosphor layer 112 and the axis of rotation O of the phosphor wheel 110 is $R_{OUT}$–O and a distance between an end face $P_{OUT}$ of the partition plate 130 on the side opposite to the motor 113 and the axis of rotation O of the phosphor wheel 110 is $P_{OUT}$–O, it is preferable that the position of the end face $P_{OUT}$ of the partition plate 130 on the side opposite to the motor 113 be $P_{OUT}$–O>$R_{OUT}$–O.

Further, it is preferable that the partition plate 130 be increased, toward the downstream side of the rotation direction, in a distance in a circumferential direction measured from a straight line passing the axis of rotation O and the motor 113 side end face $P_{IN}$ of the partition plate 130 as it goes toward the outer circumference side of the substrate 111 as illustrated in FIG. 1A. In addition, it is preferable that a side surface of the partition plate 130 be in contact with the housing 114 so as to set apart the space in the housing 114 as illustrated in FIG. 1B. Thereby, it becomes possible to suppress mixing of the air that has been warmed by being irradiated with the blue laser light Lb with cold air that has been cooled by the heat exchanger 120.

Still further, it is preferable to dispose the partition plate 130 on both of the irradiated surface and the non-irradiated surface so as to interpose the substrate 111 of the phosphor wheel 110 as illustrated in FIG. 1B. In other words, it is preferable to provide, in the motor 113 side end face $P_{IN}$ of the partition plate 130, a gap G into which the substrate 111 of the phosphor wheel 110 is to be interposed. In addition, it is preferable that an interval between the partition plate 130 and the substrate 111 be made as narrow as possible. Therefore, the shape of the gap G in the partition plate 130 into which the substrate 111 is to be interposed may be a shape in which a depression 131 for prevention of contact thereof with the phosphor layer 112 is provided at a position facing the phosphor layer 112 as illustrated in FIG. 2A. Thereby, it becomes possible for the partition plate 130 to come close to a position that is as close as possible onto the substrate 111 on which the phosphor layer 112 is not provided. In addition, when an impact has been applied to the light conversion device 10A, contact between the partition plate 111 and the phosphor layer 112 is avoided. Incidentally, it is preferable that the depression 131 be shaped such that a depth d of the depression 131 is deeper than a thickness t of the phosphor layer 112. Further, it is preferable that the both ends of the partition plate 130 be inclined, centering on the gap G that interposes the substrate 111 of the phosphor wheel 110, toward the first space 114A side having the light emitting section X as illustrated in FIG. 2B. Specifically, it is preferable to set an angle between the partition plate 130 and the substrate 111 be equal to or less than 90 degrees. Thereby, it becomes possible to circulate the air that has been warmed by the light emitting section X efficiently toward the heat exchanger 120 side.

Incidentally, although the position of an end face P'$_{IN}$ of the phosphor wheel 110 (the second region 130B) on the non-irradiated surface side may be provided so as to be collinear with that of the irradiated surface side end face P$_{IN}$ in a Z-axis direction with the phosphor wheel 110 being interposed as illustrated in FIG. 1B, in other words, so as to become the same position as that of the irradiated face side end face P$_{IN}$ on an XY plane as illustrated in FIG. 1A, it is possible to extend the end face P'$_{IN}$ to the vicinity of the axis of rotation O of the phosphor wheel 110 by the amount that the motor 113 is not present. Thereby, the air is warmed by the substrate 111 that has been heated by being irradiated with the blue laser light Lb and mixing of not-yet-cooled air into the first space 114A (specifically, the vicinity of the light emitting section X) is more restricted. Thus, it is preferable that the position of the end face P'$_{IN}$ of the second region 130B of the partition plate 130 be P$_{IN}$–O>P'$_{IN}$–O.

1-2. Configuration of Projection Display Apparatus

FIG. 3 is a schematic diagram illustrating a configuration example of a projector (a projector 1) as one example of the projection display apparatus. The projector 1 includes the light source optical system 100 equipped with the light conversion device 10A according to the technology, an image generation system 400, and a projection optical system 600. The image generation system 400 includes an image generation element 410 that generates an image on the basis of light with which the image generation element 410 is irradiated and an illumination optical system 420 that irradiates the image generation element 410 with light outputted from the light source optical system 100. The projection optical system 600 projects the image generated by the image generation element 410.

FIG. 4 is a schematic diagram illustrating one example of configurations of the light source section 20 and the light conversion device 10 that configure the light source optical system 100. The light source section 20 includes, for example, a light source 210 equipped with a plurality of LDs, condensing mirrors 211A and 211B and a condensing mirror 212 that serve as an optical system for condensing of the light outputted from the light source 210 onto the phosphor wheel 110, a blue light source optical system 215 that outputs the blue laser light Lb that is to be synthesized with the light (the yellow light Ly) outputted from the light conversion device 10 into the white light (Lw), and the dichroic mirror 213 and the condensing lens 214 that serve as an optical system that synthesizes and outputs the white light (Lw) to the outside (for example, toward the image synthesis system side).

The light source 210 is a blue LD that is able to oscillate the blue laser light Lb having a peak wavelength of emission intensity in a wavelength range of, for example, 400 nm to 500 nm. The blue LD is equivalent to one or a plurality of solid-state light sources that output light of a predetermined wavelength region. Other light sources such as the LED may be used as the light source 210 other than the LD. In addition, the predetermined wavelength is also not limited to that of the blue laser light Lb having the peak wavelength of emission intensity in the above-described 400 nm to 500 nm.

The condensing mirrors 211A and 211B each have a concave reflecting surface that substantially collimates fluxes of light outputted from the plurality of LDs disposed in the light source 210 and concentrates them on the condensing mirror 212. The condensing mirror 212 reflects the light concentrated by the condensing mirrors 211A and 211B to the phosphor wheel 110.

The dichroic mirror 213 has a property of selectively reflecting colored light of a predetermined wavelength region and transmitting strings of light of other wavelength regions. Specifically, for example, the blue laser light Lb that has been outputted from the light source 210 and has passed through the condensing mirrors 211A and 211B and the condensing mirror 212 is transmitted through the dichroic mirror 213 and is radiated to the phosphor layer 112 formed on the phosphor wheel 110 which will be described later and thereby the phosphor is excited therewith. The excited phosphor emits light (that is, the yellow light Ly) of the wavelength region including wavelength regions, for example, ranging from a red wavelength region to a green wavelength region. The yellow light Ly is reflected by the dichroic mirror 213 toward the condensing lens 214 side.

The image generation system 400 includes, for example, an integrator element 430, a polarization conversion element 440, and a condensing lens 450 as illustrated in FIG. 4. The integrator element 430 includes a first fly-eye lens 431 having a plurality of micro-lenses that are arrayed two-dimensionally and a second fly-eye lens 432 having a plurality of micro-lenses that are arrayed in one-to-one correspondence with the respective micro-lenses thereof.

Light (collimated light) that enters the integrator element 430 from the light source optical system 100 is divided by the micro-lenses of the first fly-eye lens 431 into the plurality of fluxes that are, then, imaged on the corresponding micro-lenses of the second fly-eye lens 432 respectively. The respective micro-lenses of the second fly-eye lens 432 function as secondary light sources and irradiate the polarization conversion element 440 with a plurality of streaks of collimated light, as incident light, that are made uniform in luminance.

The integrator element 430 has a function of arranging the incident light, from the light source optical system 100, with which the polarization conversion element 440 is irradiated so as to have a uniform luminance distribution as a whole.

The polarization conversion element 440 has a function of arranging a polarization state of the incident light that enters via the integrator element 430 and so forth. The polarization conversion element 440 outputs outgoing light that includes blue laser light B3, green light G3, and red light R3 via, for example, the condensing lens 450 and so forth disposed on the output side of the light source optical system 100.

The illumination optical system 420 includes dichroic mirrors 460 and 470, mirrors 480, 490, and 500, relay lenses 510 and 520, field lenses 530R, 530G and 530B, liquid crystal light valves 410R, 410G and 410B that serve as image generation elements, and a dichroic prism 540.

The dichroic mirrors 460 and 470 each have a property of selectively reflecting the colored light of the predetermined wavelength regions and transmitting the streaks of light of other wavelength regions. For example, with reference to FIG. 4, the dichroic mirror 460 selectively reflects the red light R3. The dichroic mirror 470 selectively reflects the green light G3 between the green light G3 and the blue laser light LbB3 that have been transmitted through the dichroic mirror 460. The remaining blue laser light LbB3 is transmitted through the dichroic mirror 470. Thereby, the light (the white light Lw) outputted from the light source optical system 100 is separated into a plurality of streaks of colored light of different colors.

The separated red light R3 is reflected by the mirror 480 and is collimated by passing through the field lens 530R and then enters the liquid crystal light valve 410R that is for red light modulation. The green light G3 is collimated by passing through the field lens 530G and then enters the liquid crystal light valve 410G that is for green light modulation. The blue laser light LbB3 passes through the relay lens 510 and is reflected by the mirror 490, then further passes through the relay lens 520 and is reflected by the mirror 500. The blue laser light LbB3 that has been reflected by the mirror 500 is collimated by passing through the field lens 530B and then enters the liquid crystal light valve 410B that is for modulation of the blue laser light Lb.

The liquid crystal light valves 410R, 410G and 410B are electrically coupled with an unillustrated signal source (for example, a PC and so forth) that supplies image signals including image information. The liquid crystal light valves 410R, 410G and 410B modulate streaks of the incident light pixel by pixel on the basis of the supplied image signals of respective colors and generate a red image, a green image, and a blue image respectively. Streaks of modulated light of respective colors (the formed images) enter the dichroic prism 540 and are synthesized together. The dichroic prism 540 superposes and synthesizes together the streaks of light of respective colors that have entered from three directions and outputs synthesized light toward the projection optical system 600.

The projection optical system 600 includes a plurality of lenses 610 and so forth and irradiates an unillustrated screen with the light synthesized by the dichroic prism 540. Thereby, a full-color image is displayed.

1-3. Workings and Effects

As described above, a projection display apparatus that uses the light conversion device is developed. The light conversion device uses LD as a solid-state light source, and causes streaks of light of different wavelength regions to be outputted from the phosphor by using the laser light outputted from the LD as the excitation light to utilize such streaks of light. In the projection display apparatus that uses the laser light as the excitation light in this way, the light conversion device is heated by being irradiated with the laser light and specifically the phosphor and a substrate on which the phosphor is formed are largely heated. Accordingly, it has been necessary to suppress temperature rising for temperature characteristics of light conversion efficiency of the phosphor and heat resistivity property of a binder and so forth for formation of the phosphor on the substrate. Therefore, various improvements are made, examples of which include: suppressing deterioration of the phosphor by rotating a member equipped with the phosphor (for example, the phosphor wheel) so as to change the position that is irradiated with the laser light; and housing the light conversion device in an air-tight container equipped with an air circulation path so as to improve the cooling efficiency of the position that is irradiated with the laser light. However, because of the structure thereof, it has been difficult to sufficiently cool the position that is irradiated with the laser light (the light emitting section) and the wheel due to, for example, flowing of the air that has been warmed by being irradiated with the laser light into the position that is irradiated with the laser light before the air is cooled by a heat exchanger.

In contrast, in the present embodiment, the partition plate 130 is provided on the phosphor wheel 110 that is housed in the housing 114 to partition the space in the housing 114. Specifically, the space in the housing 114 is partitioned by the partition plate 130 into the first space that includes the light emitting section X on which the blue laser light Lb as the excitation light condenses and the second space not including the light emitting section X. Thereby, it becomes possible to regulate the flow of the air that circulates in the housing 114, specifically, the flow of the air that has been warmed by the substrate 111 heated by being irradiated with the blue laser light Lb.

As described above, in the present embodiment, the partition plate 130 is provided, on the phosphor wheel 110 housed in the housing 114, that partitions the space in the housing 114 into the first space that including the light emitting section X to be irradiated with the blue laser light Lb that enters from the outside and the second space not including the light emitting section X. Thereby, the phosphor layer 112 and the substrate therearound are heated by being irradiated with the blue laser light Lb and thereby it becomes possible to prevent the air (the warm air) that has been warmed from mixing with the air (the cooling air) for cooling on the phosphor wheel 110 and to circulate the warm air to the heat exchanger 120. Thus, it is possible to efficiently cool the warmed air in the light conversion device 10A, and the cooling efficiency of the light emitting section X that outputs the yellow light Ly by being irradiated with the blue laser light Lb is improved. In addition, thereby, it becomes possible to reduce the power consumption. Accordingly, it becomes possible to provide the light source device (the light source optical system 100) and the projection display apparatus (the projector 1) that are improved in reliability.

Incidentally, the housing 114 may be an air-tight container in which the inside of the housing 114 is shut off from the outside, or may be the one in which, for example, an opening for connection with the outside are provided at a portion of the housing 114.

2. MODIFICATION EXAMPLES

In the following, modification examples (modification examples 1 to 4) of the disclosure will be described. Incidentally, in the modification examples that will be described hereinafter, the same numerals are assigned to configurations similar to those in the above-described embodiment and description thereof is omitted.

2-1. Modification Example 1

FIG. 5 illustrates a planar configuration of a light conversion device 10B according to a modification example (a modification example 1) of the above-described embodiment of the disclosure. The light conversion device 10B is used as, for example, the light conversion device 10 included in the light source optical system (the light source apparatus) 100 of the above-described projector 1 (see FIG. 3 and FIG. 4). This modification example is different from the above-described embodiment in that a dust-absorbing member is provided on a place where the flow of the air that circulates in the housing 114 suddenly changes.

As described above, it is preferable to provide the dust-absorbing member on the place where the flow of the air that circulates in the housing 114 suddenly changes, and it is preferable to provide a dust-absorbing pad 132 as the dust-absorbing member, for example, at a position where the air that has been warmed by the light emitting section X flows from the first space 114A into the second space 114B. In addition, it is preferable to provide a dust-absorbing pad 133 on a location that is not directly irradiated with streaks of primary scattered light of the blue laser light Lb that is the excitation light and the yellow light Ly that is fluorescent light, for example, on a surface of the partition plate 130 which faces the second space 114B. Electrostatic filters, un-woven fabric, porous filters and so forth may be given as the dust-absorbing pads 132 and 133.

As described above, in this modification example, the dust-absorbing pads 132 and 133 are provided on the place where the flow of the air that circulates in the housing 114 suddenly changes. For example, the dust-absorbing pads 132 and 133 are provided at the position where the air that has been warmed by the light emitting section X flows from the first space 114A into the second space 114B. For example, the dust-absorbing pads 132 and 133 are provided on the surface of the partition plate 130 which faces the second space 114B of the partition plate 130 and which is not directly irradiated with the streaks of primary scattered light of the excitation light such as the blue laser light Lb and the fluorescence such as the yellow light Ly. Thereby, dust and so forth generated in the housing 114 are absorbed by the dust-absorbing pads 132 and 133 and it becomes possible to reduce burning of dust and forth onto optical components (for example, see FIG. 7A) that will be described later such as the light emitting section X and the condensing lens 115.

Consequently, such effects that the light conversion efficiency is improved and the service life of the phosphor wheel 110 becomes long are achieved in addition to the effects in the above-described embodiment. Further, such an effect that a reduction in light transmittance of the optical component (for example, the condensing lens 115) is reduced is achieved.

2-2. Modification Example 2

FIG. 6 illustrates a cross-sectional configuration of a light conversion device 10C according to a modification example (a modification example 2) of the above-described embodiment of the disclosure. The light conversion device 10C is used as, for example, the light conversion device 10 included in the light source optical system (the light source apparatus) 100 of the above-described projector 1 (see FIG. 3 and FIG. 4). This modification example is different from the above-described embodiment and the modification example 1 in that a fin 117 is provided on the back surface of the substrate 111 of the phosphor wheel 110.

It is preferable that the fin 117 be made of a metal that has relatively good thermal conductivity and is light-weighted such as, for example, aluminum. Heat from the phosphor layer 112 that is heated by being irradiated with the blue laser light Lb is efficiently dissipated by joining the fin 117 having good thermal conductivity to the substrate 111 in this way. Incidentally, at this time, it is preferable to provide a gap G' that interposes the fin 117 in the partition plate 130 other than the gap G that interposes the substrate 111 of the phosphor wheel 110.

It becomes possible to further improve the cooling efficiency of the phosphor wheel 110 by providing the fin 117 on the back surface of the substrate 111 of the phosphor wheel 110 as described above.

2-3. Modification Example 3

FIG. 7A illustrates a planar configuration of a light conversion device 10D according to a modification example (a modification example 3) of the above-described embodiment of the disclosure, and FIG. 7B illustrates a cross-sectional configuration of the light conversion device 10D illustrated in FIG. 7A. The light conversion device 10D is used as, for example, the light conversion device 10 included in the light source optical system (the light source apparatus) 100 of the above-described projector 1 (see FIG. 3 and FIG. 4). This modification example is different from the above-described embodiment and so forth in that a lens holder 134 that holds the condensing lens 115 disposed between the light source 210 and the phosphor wheel 110 also serves as the above-described partition plate 130.

Incidentally, although the lens holder 134 alone is able to regulate the flow of the air in the housing 114 and to prevent the air that has been warmed by being irradiated with the blue laser light Lb and circulated by the rotation of the phosphor wheel 110 from flowing into the light emitting section X before cooled by the heat exchanger 120, the light emitting section X on the phosphor layer 112 and the air that has been warmed by being irradiated with the blue laser light Lb are more cooled by combining the lens holder 134 with the partition plate 130 as illustrated in FIG. 7A and FIG. 7B. Thereby, it becomes possible to improve the cooling efficiencies of the light emitting section X and the air in the housing 114. Incidentally, a surface S1 of the lens holder 134 illustrated in FIG. 7A is equivalent to the partition plate 111 that is provided on the phosphor wheel 110 according to the above-described embodiment and so forth.

2-4. Modification Example 4

FIG. 8A illustrates a planar configuration of a light conversion device 10E according to a modification example (a modification Example 4) of the above-described embodiment of the disclosure. FIG. 8B and FIG. 8C respectively illustrate cross-sectional configurations along the II-II line (FIG. 8B) and the III-III line (FIG. 8C) of the light conversion device 10E illustrated in FIG. 8A. FIG. 8D illustrates the light conversion device 10E viewed from the VI-VI line of the light conversion device 10E illustrated in FIG. 8A. The light conversion device 10E is used as, for example, the light conversion device 10 included in the light source optical system (the light source apparatus) 100 of the above-described projection display apparatus 1 (see FIG. 3 and FIG. 4). This modification example is different from the above-described embodiment and so forth in that a blower (a fan 140) is disposed on the back surface side of the phosphor wheel 110 together with the heat exchanger 120.

In the light conversion device 10E according to this modification example, a partition wall 114C is provided in the housing 114 as illustrated in FIG. 8B and FIG. 8C and thereby the inside of the housing 114 is partitioned into a space in which the phosphor wheel 110 is disposed and a space in which the heat exchanger 120 and the fan 140 are disposed. The heat exchanger 120 is configured by the heat absorption portion 121A placed in the housing 114, the heat dissipation portion 121B placed outside the housing 114, and the heat pipe 122 that couples together the heat absorption portion 121A and the heat dissipation portion 121B. In the light conversion device 10E according to this modification example, in a space isolated from the phosphor wheel 110, the heat absorption portion 121A is disposed at a position corresponding to the second space 114B not including the light emitting section X, and the fan 140 is disposed at a position where the air that has been cooled by the heat absorption portion 121A is sucked as indicated by arrows $B_3$ in FIG. 8D. Incidentally, the air that has been warmed by the light emitting section X on the phosphor layer 112 is circulated by the rotation of the phosphor wheel 110, flows into the heat absorption portion 121A in the second space 114B as indicated by an arrow B2 in FIG. 8B, and is cooled by heat absorption by the heat dissipation fin 121 and the heat pipe 122. The heat pipe 122 is cooled with air (an arrow $B_4$) sent from the fan 150 outside the housing 114.

It becomes possible to increase a quantity of air that circulates in the housing 114 and thereby to improve coolability by disposing the fan 140 in the housing 114 in this way. Further, it is possible to efficiently cool the light emitting section X and to improve the cooling efficiency of the air warmed by the light emitting section X, by disposing the fan 140 on the light emitting section X side (in the first space 114A) and disposing the heat exchanger 120 on the downstream side (in the second space 114B) of the air that circulates in the housing 114.

Incidentally, the technology is not limited to the above-described embodiment and modification examples 1 to 4, and it is possible to achieve other various embodiments, for example, by combining together respective requirements described in the modification examples 1 to 4. For example, the dust-absorbing pad 141 may be provided in the vicinity of a port of the fan 140 of the light conversion device 10E described in the modification example 4 through which air is sent to the light emitting section X as illustrated in FIG. 8C. Thereby, dust and so forth contained in the air (an arrow $B_1$) that is cooled by the heat exchanger 120 and is sent to the light emitting section X by the fan 140 are removed and it becomes possible to prevent the dust and so forth from being burned onto the light emitting section X.

In addition, although in the above-described embodiment and so forth, the so-called reflection type phosphor wheel 110 that reflects the yellow light Ly, outputted from the phosphor that has been excited with the blue laser light Lb radiated from the light source 210, toward the light source 210 side has been described by way of example, a so-called transmission type phosphor wheel, for example, may be used without being limited thereto. The transmission type phosphor wheel transmits the blue laser light Lb and outputs the yellow light Ly outputted from the phosphor to the back surface of the substrate 111.

Further, for the projector 1 illustrated in FIG. 3, described is the image generation system 400 configured with use of a transmission type liquid crystal panel. However, it is possible to configure the image generation system also by using a reflection type liquid crystal panel. A digital micromirror device (DMD), for example, may be used as an image generation element. Further, a polarization beam splitter (PBS), a color synthesis prism that synthesizes together picture signals of respective colors of R, G, and B, a TIR (Total Internal Reflection) prism and so forth may be used in place of the dichroic prism 540.

Although in the above-described embodiment and so forth, description has been made by referring specifically to the respective constitutional elements (the optical systems) of the illumination device, it is not necessary to provide all of the constitutional elements, and other constitutional elements may be further provided.

Furthermore, although in the above-described embodiment and so forth, description has been given of the display apparatus of the projection type and so forth as an example of application of the light conversion device of the disclosure, the application is not limited thereto. For example, application to an exposure apparatus such as a stepper is also possible.

In addition, an apparatus other than the above-described projector may be configured as the projection display apparatus according to the technology. In addition, the illumination device according to the technology may be used in an apparatus that is not the projection display apparatus.

Incidentally, the technology may also have such configurations as follows.

(1) A light conversion device including:
a light conversion section that is rotatable about an axis of rotation;
a cooling section that cools the light conversion section;
a housing that houses the light conversion section and the cooling section; and
a partition member that is provided on the light conversion section, and partitions a space in the housing.

(2) The light conversion device according to (1), in which
the light conversion section includes a light emitting section that emits light by excitation light that enters from outside, and
the partition member partitions the space in the housing into a first space that includes the light emitting section and a second space that does not include the light emitting section.

(3) The light conversion device according to (2), in which air cooled by the cooling section circulates from the first space that includes the light emitting section to the second space.

(4) The light conversion device according to (3), in which the partition member is disposed to block flowing, into the light emitting section, of the air that is warmed by the light emitting section and flows by rotation of the light conversion section.

(5) The light conversion device according to any one of (2) to (4), in which the partition member is disposed on an irradiated surface, to be irradiated with the excitation light, of the light conversion section and on a non-irradiated surface of the light conversion section.

(6) The light conversion device according to any one of (2) to (5), in which
the light conversion section includes a substrate that rotates about the axis of rotation, and a light emitting layer that is provided on the substrate and includes the light emitting section, and
the partition member has a depression at a position that faces the light emitting layer.

(7) The light conversion device according to any one of (1) to (6), in which the partition member extends from a position on the light conversion section to the cooling section.

(8) The light conversion device according to any one of (1) to (7), in which an angle between the partition member and a rotation surface of the light conversion section is equal to or less than 90 degrees.

(9) The light conversion device according to any one of (2) to (8), in which
the light conversion section includes, on an irradiated surface, a light condensing lens that condenses the excitation light and held by a holding member, and
the holding member serves as the partition member.

(10) The light conversion device according to any one of (2) to (9), further including a dust-absorbing member.

(11) The light conversion device according to (10), in which the dust-absorbing member is provided at least on a portion of the partition member on side on which the second space is located.

(12) The light conversion device according to (10) or (11), in which the dust-absorbing member is provided at least on a portion of the housing on side on which the second space is located.

(13) The light conversion device according to any one of (1) to (12), in which the partition member is fixed to the housing.

(14) The light conversion device according to any one of (1) to (13), in which the partition member is plate-shaped.

(15) A light source apparatus including
a light source optical system including one or two or more light sources and a light conversion device that converts a wavelength of light outputted from the light source,
the light conversion device including
a light conversion section that is rotatable about an axis of rotation,
a cooling section that cools the light conversion section,
a housing that houses the light conversion section and the cooling section, and
a partition member that is provided on the light conversion section, and partitions a space in the housing.

(16) A projection display apparatus including:
a light source optical system including one or two or more light sources and a light conversion device that converts a wavelength of light outputted from the light source;
an image generation optical system that generates image light by modulating, on basis of an input picture signal, light from the light source optical system; and
a projection optical system that projects the image light generated by the image generation optical system,
the light conversion device including
a light conversion section that is rotatable about an axis of rotation,
a cooling section that cools the light conversion section,
a housing that houses the light conversion section and the cooling section, and
a partition member that is provided on the light conversion section, and partitions a space in the housing.

The present application is based on and claims priority from Japanese Patent Application No. 2015-087846 filed with the Japan Patent Office on Apr. 22, 2015, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A light conversion device, comprising:
a light conversion section rotatable about an axis of rotation;
a cooling section configured to cool the light conversion section;
a housing configured to house the light conversion section and the cooling section; and
a partition member, wherein
a first region of the partition member is on an irradiated surface of the light conversion section,
a second region of the partition member is on a non-irradiated surface of the light conversion section,
the non-irradiated surface of the light conversion section is opposite to the radiated surface of the light conversion section,
a third region of the partition member extends from the axis of rotation of the light conversion section,
the third region is different from each of the first region and the second region,
the partition member is configured to:
partition a space in the housing into a first space in the housing and a second space in the housing;
control a first flow of air, cooled by the cooling section, through the first space, wherein the first flow of the air is in a first direction within the housing; and
control a second flow of the air, warmed by the light conversion section, through the second space, wherein
the second flow of the air is in a second direction, opposite to the first direction, within the housing,
the first direction is a direction of the first flow of the air from the cooling section to the light conversion section, and
the second direction is a direction of the second flow of the air from the light conversion section to the cooling section, and
the first flow and the second flow are controlled based on rotation of the light conversion section about the axis of rotation.

2. The light conversion device according to claim 1, wherein
the light conversion section includes a light emitting section configured to emit light based on excitation light,
the first space includes the light emitting section, and
the second space does not include the light emitting section.

3. The light conversion device according to claim 2, wherein the light conversion section is configured to circulate the air cooled by the cooling section from the first space to the second space.

4. The light conversion device according to claim 2, wherein
the irradiated surface is configured to be irradiated with the excitation light.

5. The light conversion device according to claim 2, wherein the light conversion section further includes:
a substrate rotatable about the axis of rotation; and
a light emitting layer on the substrate, wherein
the light emitting layer includes the light emitting section, and
the partition member has a depression at a position that faces the light emitting layer.

6. The light conversion device according to claim 2, wherein
the light conversion section further includes, on an irradiated surface, a light condensing lens configured to condense the excitation light,
the light condensing lens is held by a holding member, and
the holding member is configured to serve as the partition member.

7. The light conversion device according to claim 2, further comprising a dust-absorbing member.

8. The light conversion device according to claim 7, wherein
the dust-absorbing member is on a portion of the partition member which is on a side on which the second space is located.

9. The light conversion device according to claim 7, wherein
the dust-absorbing member is on a portion of the housing which is on a side on which the second space is located.

10. The light conversion device according to claim 1, wherein the partition member extends from a position on the light conversion section to the cooling section.

11. The light conversion device according to claim 1, wherein an angle between the partition member and a rotation surface of the light conversion section is equal to or less than 90 degrees.

12. The light conversion device according to claim 1, wherein the partition member is fixed to the housing.

13. The light conversion device according to claim 1, wherein
the partition member is plate-shaped.

14. The light conversion device according to claim 1, wherein the third region of the partition member extends in a direction perpendicular to the axis of rotation.

15. A light source apparatus, comprising:
a light source optical system including:
at least one light source; and
a light conversion device configured to convert a wavelength of light outputted from the at least one light source,
the light conversion device including:
a light conversion section rotatable about an axis of rotation;
a cooling section configured to cool the light conversion section;
a housing configured to house the light conversion section and the cooling section; and
a partition member, wherein
a first region of the partition member is on an irradiated surface of the light conversion section,
a second region of the partition member is on a non-irradiated surface of the light conversion section,
the non-irradiated surface of the light conversion section is opposite to the radiated surface of the light conversion section,
a third region of the partition member extends from the axis of rotation of the light conversion section,
the third region is different from each of the first region and the second region,
the partition member is configured to:
partition a space in the housing into a first space in the housing and a second space in the housing;
control a first flow of air, cooled by the cooling section, through the first space, wherein the first flow of the air is in a first direction within the housing; and
control a second flow of the air, warmed by the light conversion section, through the second space, wherein
the second flow of the air is in a second direction, opposite to the first direction, within the housing,
the first direction is a direction of the first flow of the air from the cooling section to the light conversion section, and
the second direction is a direction of the second flow of the air from the light conversion section to the cooling section, and
the first flow and the second flow are controlled based on rotation of the light conversion section about the axis of rotation.

16. A projection display apparatus, comprising:
a light source optical system including:
at least one light source; and
a light conversion device configured to convert a wavelength of light outputted from the at least one light source;
an image generation optical system configured to generate image light based on modulation of the light from the light source optical system; and
a projection optical system configured to project the image light generated by the image generation optical system,
wherein the light conversion device comprises:
a light conversion section rotatable about an axis of rotation;
a cooling section configured to cool the light conversion section;
a housing configured to house the light conversion section and the cooling section; and
a partition member, wherein
a first region of the partition member is on an irradiated surface of the light conversion section,
a second region of the partition member is on a non-irradiated surface of the light conversion section,
the non-irradiated surface of the light conversion section is opposite to the radiated surface of the light conversion section,
a third region of the partition member extends from the axis of rotation of the light conversion section,
the third region is different from each of the first region and the second region,
the partition member is configured to:
partition a space in the housing into a first space in the housing and a second space in the housing;
control a first flow of air, cooled by the cooling section, through the first space, wherein the first flow of the air is in a first direction within the housing; and
control a second flow of the air, warmed by the light conversion section, through the second space, wherein
the second flow of the air is in a second direction, opposite to the first direction, within the housing,
the first direction is a direction of the first flow of the air from the cooling section to the light conversion section, and
the second direction is a direction of the second flow of the air from the light conversion section to the cooling section, and
the first flow and the second flow are controlled based on rotation of the light conversion section about the axis of rotation.

* * * * *